United States Patent Office 3,296,068
Patented Jan. 3, 1967

3,296,068
o- AND m-ALLYLOXYPHENYL AND m-ALKOXY-PHENYL-N-METHYL CARBAMATES AND THE INSECTICIDAL USE THEREOF
Roger Williams Addor, Westport, Conn., assignor to American Cyanamid Company, New York, N.Y., a corporation of Maine
No Drawing. Filed July 28, 1960, Ser. No. 45,776
5 Claims. (Cl. 167—30)

This application is a continuation-in-part of my copending application, Ser. No. 855,011, filed Nov. 24, 1959, and now abandoned.

The present invention relates to new chemical compounds and to their use as insecticides.

The new compounds are a group of ortho or meta-substituted phenyl esters of N-methylcarbamic acid which may be represented by the general formula:

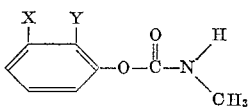

wherein X and Y are selected from the group consisting of R—O— and H, provided that when X is R—O— Y is H and when Y is R—O X is H, and R stands for an aliphatic hydrocarbon radical containing from one to five carbon atoms such as methyl, ethyl, propyl, isopropyl, allyl, 2-methallyl and butyl.

Certain aryl esters of N-methylcarbamic acid are known to have some insecticidal activity. The new compounds herein, however, and wherein the lower alkoxy group is in the ortho or meta position have been found to have an extremely high order of insecticidal activity. Also, the new N-methylcarbamates of this invention are superior to the N,N-dialkylcarbamates, e.g. the N,N-dimethyl analogs. Furthermore, a comparison of activity against house flies with the best previously known monosubstituted phenyl-N-methylcarbamate, i.e. m-t-butyl-N-methylcarbamate shows the new compounds herein, as typified, for example, by m-allyloxy-N-methylcarbamate, to be superior. This new compound is also highly active against aphids, mites and cockroach.

The new compounds may be readily prepared by reacting methyl isocyanate with an ortho or meta-substituted phenol of the formula:

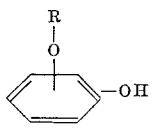

wherein R has the meaning shown above and the group R—O— is in either the ortho or meta position, in the presence of an inert solvent such as ethyl ether, benzene and the like.

The methyl isocyanate reactant may be prepared by the method described by R. J. Slocumbe et al., Jour. Am. Chem. Soc. 72, 1888 (1950) which involves the action of pyridine on methylcarbamyl chloride produced from phosgene and methylamine.

The following examples further illustrate the invention but are not to be construed as limiting the same.

*Example 1.—m-Methoxyphenyl-N-methylcarbamate*

A mixture of 5.2 g. (0.042 mole) of m-methoxyphenol, 2.5 ml. (0.042 mole) of methyl isocyanate and a trace of triethylamine in 15 ml. of dry ether was allowed to stand overnight in a tightly stoppered flask. Addition of 10 ml. of petroleum ether resulted in the formation of 5.6 g. of crystalline solid product, M.P. 71–72° C. Vacuum sublimation gave the slightly yellow needle-like product, M.P. 72–73° C.

*Example 2.—m-Ethoxyphenyl-N-methylcarbamate*

A mixture of 13.8 g. (0.10 mole) of m-ethoxyphenol, 6.1 ml. (0.10 mole) of methyl isocyanate and a trace of triethylamine in 75 ml. of dry ether was stirred at room temperature and allowed to stand overnight. The mixture was then washed with 5% sodium hydroxide, water and saturated salt solution, and dried over magnesium sulfate. Stripping off the ether yielded 12.4 g. of crystalline solid product, M.P. 53–58° C. Recrystallization from a benzene-hexane solution and vacuum sublimation yielded the colorless, needle-like product, M.P. 60–61° C.

*Example 3.—m-Isopropoxyphenyl-N-methylcarbamate*

A mixture of 6.8 g. (0.045 mole) of m-isopropoxyphenol, 2.7 ml. (0.045 mole) of methyl isocyanate and a trace of triethylamine in 25 ml. of dry ether was allowed to stand overnight in a stoppered flask. After adding 50 ml. of a benzene-ether solution, the mixture was washed with 5% sodium hydroxide, water and saturated salt solution, and dried over magnesium sulfate. Stripping off the solvent gave 8.3 g. of crystalline product, M.P. 60–65° C. Continuous extraction of the solid product on a soxhlet apparatus with petroleum ether yielded the colorless, needle-like product, M.P. 63.6–64.4° C.

*Example 4.—m-Allyloxyphenyl-N-methylcarbamate*

A mixture of 3.0 g. (0.018 mole) of m-hydroxyphenyl N-methylcarbamate, 2.4 g. (0.020 mole) of allyl bromide and 2.5 g. (0.020 mole) of potassium carbonate was refluxed for three hours in 20 ml. of dry acetone. The reaction mixture was poured into 50 ml. of water, and the resulting aqueous suspension was extracted with an ether-benzene solution. The organic phase was washed with 5% sodium hydroxide, water and saturated salt solution, and then dried over magnesium sulfate. After stripping off the solvent, the residual product was recrystallized from hexane to give the colorless, crystalline product, M.P. 56.4–57.2° C.

*Example 5.—o-Allyloxyphenyl-N-methylcarbamate*

A mixture of 6.9 parts of o-allyloxyphenol, prepared by the method of Perkins and Trikojus (J. Chem. Soc. 1664) (1927), 2.6 parts of methylisocyanate, and a trace of triethylamine in 25 ml. of dry ether was allowed to stand at room temperature for several days. Removal of the solvent from the mixture left 9.5 parts of the desired crude carbamate as an oil which crystallized on seeding. Extraction of the solids with hexane and cooling of the hexane solution afforded 5.7 g. (60% of theory) of crystalline product of M.P. 51.5–53.0° in two crops. Further recrystallization from a benzene-hexane mixture raised the melting point to 52.5–53.7° C.

Analysis.—Calculated for $C_{11}H_{13}NO_3$: C, 63.8; H, 6.3; N, 6.8. Found: C, 63.9; H, 6.3; N, 6.8.

*Example 6.—o-Ethoxyphenyl-N-methylcarbamate*

A mixture of 9.1 parts of o-ethoxyphenol, 3.8 parts of methylisocyanate, and a trace of triethylamine in 20 ml. of dry ether was allowed to stand for several days at room temperature. The crystalline carbamate precipitated from the mixture during this time and when collected and washed with petroleum ether weighd 10.7 g. (83.2% of theory) and melted at 81.0–84.5° C. Recrystallization from hexane afforded the carbamate of melting point 82.2–83.5° C.

Analysis.—Calculated for $C_{10}H_{13}NO_3$: C, 61.5; H, 6.7; N, 7.2. Found: C, 60.9; H, 6.8; N, 7.2.

The compounds of the present invention are highly active insecticides, either by contact or by systemic action. They may be used as sprays in organic solvents, as emulsions in water or other non-solvents, or on solid carriers such as clays, talcs, diatomaceous earths and the like.

The marked activity of the N-methylcarbamate esters in controlling various insects in illustrated as follows:

Nasturtium aphid—90 to 100% kill with esters of Examples 1–6 above at a concentration of 0.01% in a solvent carrier consisting of 65% acetone and 35% water.

German cockroach—85 to 100% kill with esters of Examples 2 and 4–6 above at a concentration of 1.0% on solid carriers such as fuller's earth and attapulgus clay.

Milkweed bug—95 to 100% kill with esters of Examples 1, 2 and 4–6 above at a concentration of 1.0% on solid carriers such as attapulgus clay and pyrophyllite.

Southern armyworm—100% kill with the ester of Examples 1, 5 and 6 above at a concentration of 0.1% in a solvent carrier consisting of 65% acetone and 35% water.

Two-spotted mite—72 to 100% kill of active stages with esters of Examples 2 and 4–6 above at a concentration of 0.1% in a solvent carrier consisting of 65% acetone and 35% water.

Mosquito—100% kill with the esters of Examples 5 and 6 above at .025% concentration in a solvent carrier consisting of 65% acetone and 35% water. In comparison, dichlorodiphenyltrichloroethane (DDT) at .025% concentration gave 0% kills.

The compounds of this invention may be used in relatively small amounts sufficient to impart substantial toxicity to insecticidal compositions containing them. Generally, a sufficient toxicity is obtained when the compounds are used in insecticidal compositions in amounts from about 0.001 to 1.0% by weight, though preferably insecticidal compositions will contain from about 0.01 to about 1.0% by weight of these compounds. However, higher proportions up to about 5% by weight may be employed when desirable.

I claim:
1. An ester of N-methylcarbamic acid selected from the group consisting of m-allyloxyphenyl-N-methylcarbamate, o-allyloxyphenyl-N-methylcarbamate and m-isopropoxyphenyl-N-methylcarbamate.
2. m-Allyloxyphenyl-N-methylcarbamate.
3. o-Allyloxyphenyl-N-methylcarbamate.
4. The method of killing insect pests which comprise applying thereto in effective amounts a compound of the formula:

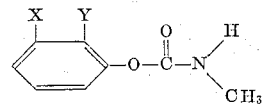

wherein X and Y are selected from the group consisting of R—O— and H, provided that when X is R—O—, Y is H and when Y is R—O—, X is H wherein R represents a member selected from the group consisting of lower alkyl and allyl and provided that when Y is R—O—, R is allyl.

5. The method of killing insect pests which comprises applying thereto in effective amounts a compound selected from the group consisting of m-allyloxyphenyl-N-methylcarbamate and o-allyloxyphenyl-N-methylcarbamate.

References Cited by the Examiner

UNITED STATES PATENTS

| | | | |
|---|---|---|---|
| 1,252,452 | 1/1918 | Kropp | 260—479 |
| 2,209,245 | 7/1940 | Bartholomaus | 260—479 X |
| 2,776,197 | 1/1957 | Gysin et al. | 260—479 X |
| 3,111,539 | 11/1963 | Bocker et al. | 260—479 |
| 3,202,573 | 8/1965 | Haubein | 260—479 |

OTHER REFERENCES

Harvill et al.: Contributions from Boyce Thompson Institute, vol. 13, No. 2, pp. 79–86, April-June 1943.

Kolbezen et al.: "Journal of Agr. and Food Chem.," vol. 2, 1954, pp. 864–870.

Metcalf et al.: Journal of Economic Entomology, vol. 53, pages 828 to 832 (1960).

LORRAINE A. WEINBERGER, *Primary Examiner*.

ABRAHAM H. WINKELSTEIN, A. LOUIS MONACELL, TOBIAS E. LEVOW, *Examiners*.

R. N. JONES, I. R. PELLMAN, *Assistant Examiners*.